United States Patent [19]
Koch

[11] 3,791,456
[45] Feb. 12, 1974

[54] TRACTOR HITCH SYSTEM INCLUDING A VERTICALLY SWINGABLE DRAWBAR POWERED BY A DRAFT LINK ACTUATOR

[75] Inventor: James Allan Koch, Hudson, Iowa
[73] Assignee: Deere & Company, Moline, Ill.
[22] Filed: Oct. 21, 1971
[21] Appl. No.: 191,316

[52] U.S. Cl. ................ 172/450, 172/248, 172/680, 280/460 A
[51] Int. Cl. .................... A01b 59/06, A01b 59/043
[58] Field of Search ... 172/248, 439, 450, 668, 677, 172/679, 680; 280/46 A, 474, 461 A, 479; 292/257, DIG. 49

[56] References Cited
UNITED STATES PATENTS

| | | | |
|---|---|---|---|
| 2,983,523 | 5/1961 | Kienzle | 280/479 A |
| 3,462,172 | 8/1969 | Thor | 280/479 R |
| 2,914,342 | 11/1959 | Silver et al. | 280/461 A |
| 2,912,258 | 11/1959 | Maughan | 172/248 |
| 2,926,931 | 5/1962 | Crampton et al. | 280/479 A |
| 3,022,092 | 2/1962 | Bunting et al. | 280/479 |
| 3,097,864 | 7/1963 | Snuggins | 280/474 |
| 3,241,861 | 3/1966 | Marindin | 172/248 |
| 3,387,862 | 6/1968 | Plate et al. | 172/450 |
| 1,816,222 | 7/1931 | Iglehart | 292/257 |
| 2,867,863 | 1/1959 | Webb et al. | 292/DIG. 49 |
| 3,618,995 | 11/1971 | McLean | 292/DIG. 49 |

FOREIGN PATENTS OR APPLICATIONS

| | | | |
|---|---|---|---|
| 1,229,306 | 9/1960 | France | 280/479 A |

*Primary Examiner*—Robert E. Pulfrey
*Assistant Examiner*—Paul T. Sewell

[57] ABSTRACT

A tractor includes a hitch system comprising a three-point hitch and a vertically swingable drawbar. Sway chains are associated with the lower draft links of the three-point hitch and have one of their ends optionally connectible either to a collar pivotable about the axis of swinging of the draft links to substantially prohibit the links from swaying throughout their paths of movement, or to a bracket fixed to a swingable frame carrying the drawbar to prohibit sway only when the links are in a raised transport position. The drawbar frame is releasably latched to the chassis of the tractor in a horizontal transport position and when the latch is released and the sway chain ends are connected to the bracket, the drawbar may be raised and lowered by actuation of the lift cylinder for raising and lowering the draft links.

10 Claims, 4 Drawing Figures

INVENTOR.
JAMES A. KOCH

INVENTOR.
JAMES A. KOCH

TRACTOR HITCH SYSTEM INCLUDING A VERTICALLY SWINGABLE DRAWBAR POWERED BY A DRAFT LINK ACTUATOR

BACKGROUND OF THE INVENTION

The present invention relates to a tractor hitch system and more particularly relates to a hitch system of the type for connection to implements to be towed or to implements to be fully- or semi-mounted on the tractor.

Hitch systems of the above type normally comprise a combination of a drawbar for towing implements and either two- or three-point hitches for fully- or semi-mounting implements. It is common practice for the draft links of the two- and three-point hitches to be raised and lowered by power, and although not presently common practice, it is known to mount a drawbar for vertical movement and to move the drawbar by power between lowered pickup and raised transport positions.

Also, relating to the present invention is the fact that many two- and three-point hitches include a pair of sway chains which are respectively connected at one of their ends to the pair of draft links of the hitches and are optionally connected to first and second locations on the tractor for respectively prohibiting substantially all sway of the links throughout their vertical movement or for prohibiting sway only when the links are in their raised transport position.

These known hitch systems are not entirely satisfactory since many require a separate power means for operating the draft links and the drawbar and the power means associated with the drawbars are often placed in areas beneath the tractors whereat the power means are quite vulnerable to being damaged by obstacles over which the tractors are passing. Also, those systems which do have a common power means for operating the draft links and drawbar often include linkages, in addition to those of the hitches, which are relatively complicated and require substantial time and effort to install for drawbar operation.

SUMMARY OF THE INVENTION

Accordingly, there is provided a novel hitch system of the described type including a pair of draft links, having chains attached thereto for sway control, and a vertically swingable drawbar. Specifically, there is provided such a hitch system wherein the chains are optionally connected to the drawbar so as to prohibit sway of the links only when they are in their transport position, the chains when so connected also permitting the drawbar to be optionally raised and lowered simultaneously with the draft links by operation of the draft link power lift means.

It is an object of the invention to provide a hitch system wherein the draft links and the drawbar are raised and lowered by a common power lift means and wherein no additional linkage is required for this operation.

Another object is to provide sway chain connections on the drawbar to which sway chains may be connected for optionally controlling the lateral movements of the draft links or for permitting the drawbar to be raised and lowered simultaneously with the draft links.

Still another object is to provide releasable latch means for securing the drawbar in its raised transport position.

These and other objects will be apparent from the ensuing description and appended drawings.

DESCRIPTION OF THE PREFERRED EMBODIMENT

Figure 1:
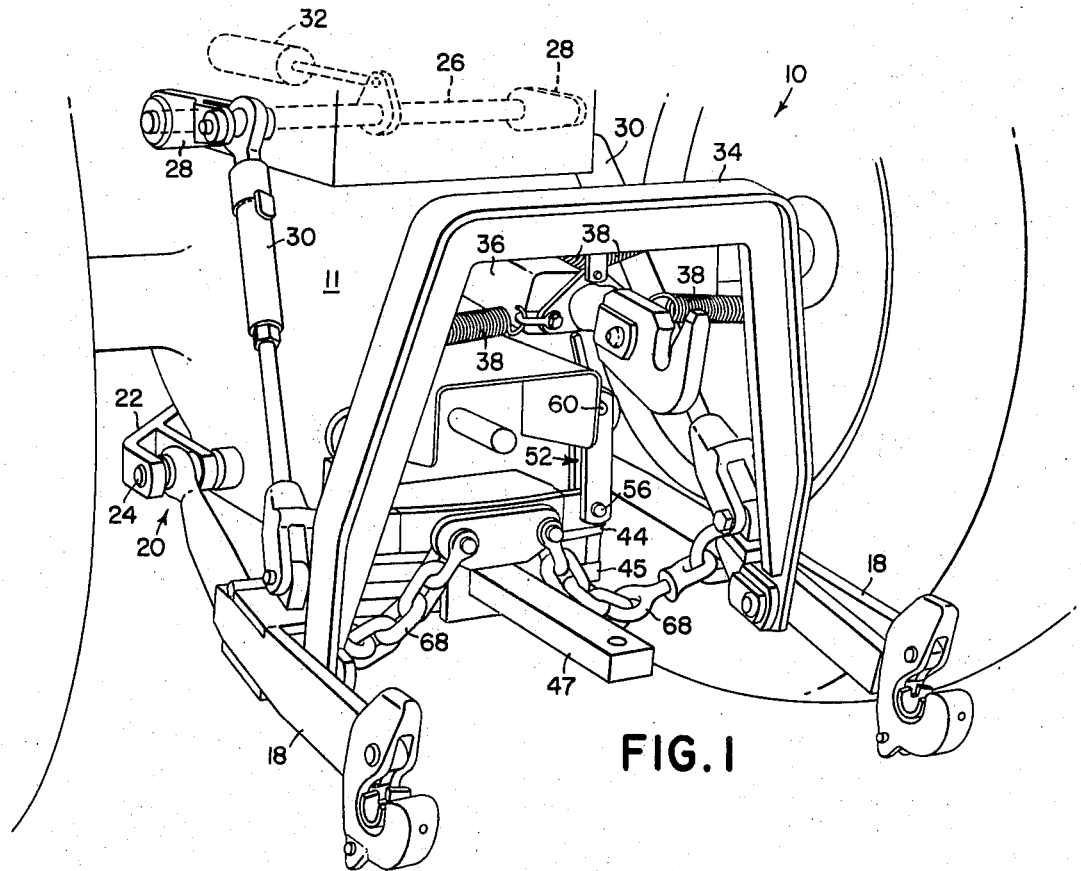
FIG. 1 is a perspective rear end view of a tractor embodying a hitch system constructed according to the present invention and showing the draft links in a lowered working position and showing the drawbar in a raised transport position.

Referring now to the drawings, there is shown the rear end portion of a tractor 10. The tractor 10 includes a chassis 11 including opposite laterally extending axle housings 12 and a central rearwardly projecting power take-off housing 13. Attached to the chassis 11 and extending rearwardly therefrom is a hitch system comprising a three-point hitch 14 and a drawbar assembly 16.

The three-point hitch 14 includes a pair of rearwardly extending draft links 18 pivoted for vertical and lateral movement by means of a pair of universal pivot connections 20 joining the forward ends of the links to a support frame 22 fixed to the underside of the chassis 11. The connections 20 include horizontal pins 24 located along a common axis X about which the links are vertically movable. A horizontal transverse rockshaft 26 is journaled in the chassis 11 and a pair of crank arms 28 (only one shown) are secured to and extend rearwardly from the opposite ends of the rock-shaft. Interconnected between the arms 28 and locations medially the ends of the draft links 18 are a pair of lift links 30. An extensible and retractable hydraulic actuator or lift cylinder, here shown schematically at 32, is located in the chassis 11 and is connected to the rockshaft 26 for rotating the latter to cause the draft links 18 to be moved between lowered working positions and a raised transport position. An inverted U-shaped arch member 34 interconnects the draft links 18 at locations medially of their ends. An upper center link 36 is formed by a hydraulic actuator having one end pivotally connected to the chassis and having its other end located beneath and supported from the arch member 34 by a plurality of springs 38.

The drawbar assembly 16 includes a generally rectangular mounting frame 40 pivoted for vertical swinging movement by means of pivot pins 42 (only one shown) joining the forward end of the frame 40 with the support frame 22. The rear end of the frame 40 comprises an arcuately curved angle member 44 spaced vertically above a similarly curved bar 45, and a rearwardly extending drawbar 47 is received between the member 44 and the bar 45 and is connected to the bar 45.

Figure 4:
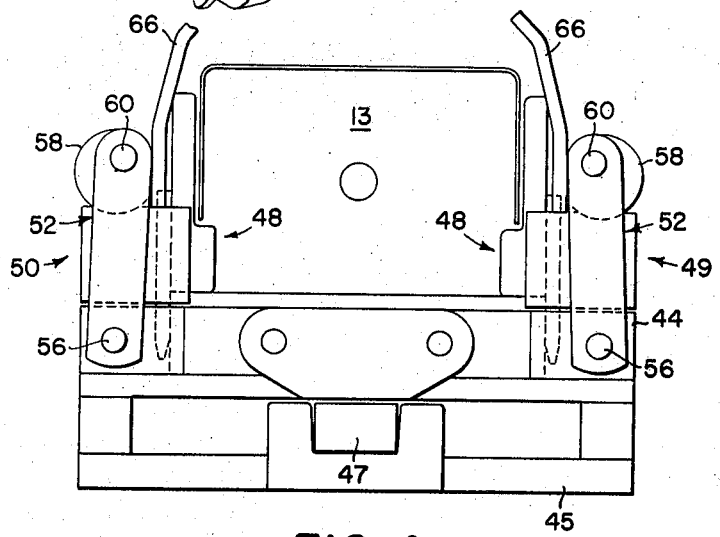
FIG. 4 is a rear view of the tractor showing only the drawbar and the releasable latch connection between the drawbar and the tractor chassis.

As can best be seen in FIG. 4 a releasable latch assembly 48 is provided for securing the drawbar assembly 16 to the chassis 11 in a raised transport position wherein the drawbar 47 is generally horizontal. The latch assembly 48 comprises separate right and left latch mechanisms 49 and 50. The mechanisms 49 and 50 respectively include right and left links 52 comprising right and left pairs of spaced straps 54, one end of each of the right and left pairs of straps respectively straddling and being pivotally connected, as at respective pins 56, to the right and left ends of the upper curved bar 44. Right and left flat, generally cylindrical cams 58 are respectively received between the other ends of the right and left pairs of straps 54 and are pivotally connected thereto by pins 60 which are respectively located eccentrically in the cams relative to the cam axes. The pairs of pins 56 and 60 are parallel and when the drawbar assembly is in the raised transport position shown in FIGS. 1 and 4, the axes of the pins extend fore-and-aft, relative to the direction of travel of the tractor 10, and are generally horizontal. The pivotal movement of the links 52 is then generally vertical, and fixed to the opposite sides of the power take-off housing 13 are a pair of vertical, laterally extending, plate-like latch seating members 62 which are respectively straddled by the right and left pairs of straps 54 when the links 52 are generally vertical. Formed along the upper edge of each of the seating members 62 is a concave seating surface 64 having a radius of curvature substantially equal to the radius of the cams 58. The cams 58 are positioned so as to engage the surfaces 64 when the links 52 approach the vertical and a pair of handles or levers 66 are respectively fixed to one side of the cams 58 to enable an operator to rotate the cams 58 in the surfaces 64 to an overcenter latched position wherein the centerlines joining the respective right and left pivot pins 56 and 60 are inwardly of the center of curvature of the seating surfaces 64.

A pair of sway chains 68 have one of their ends connected by rings 70 (only one shown) to a location medially of the ends of the draft links 18. The other ends of the sway chains 68 are optionally connectible, either to a pair of collars 72 (only one shown) pivotally received on the pins 24 inwardly of the forward ends of the draft links, or to a bracket 74 fixed to a vertical leg of the angle member 44 (as viewed in FIG. 1) of the drawbar frame 40 at a central location above the drawbar 47. When the sway chains 68 are connected to the collars 72, the draft links are substantially prohibited from swaying in both their lowered working positions and their raised transport position. On the other hand, when the sway chains 68 are connected to the bracket 74, the draft links 18 are prohibited from swaying only when they are in their raised transport position.

Figure 2:
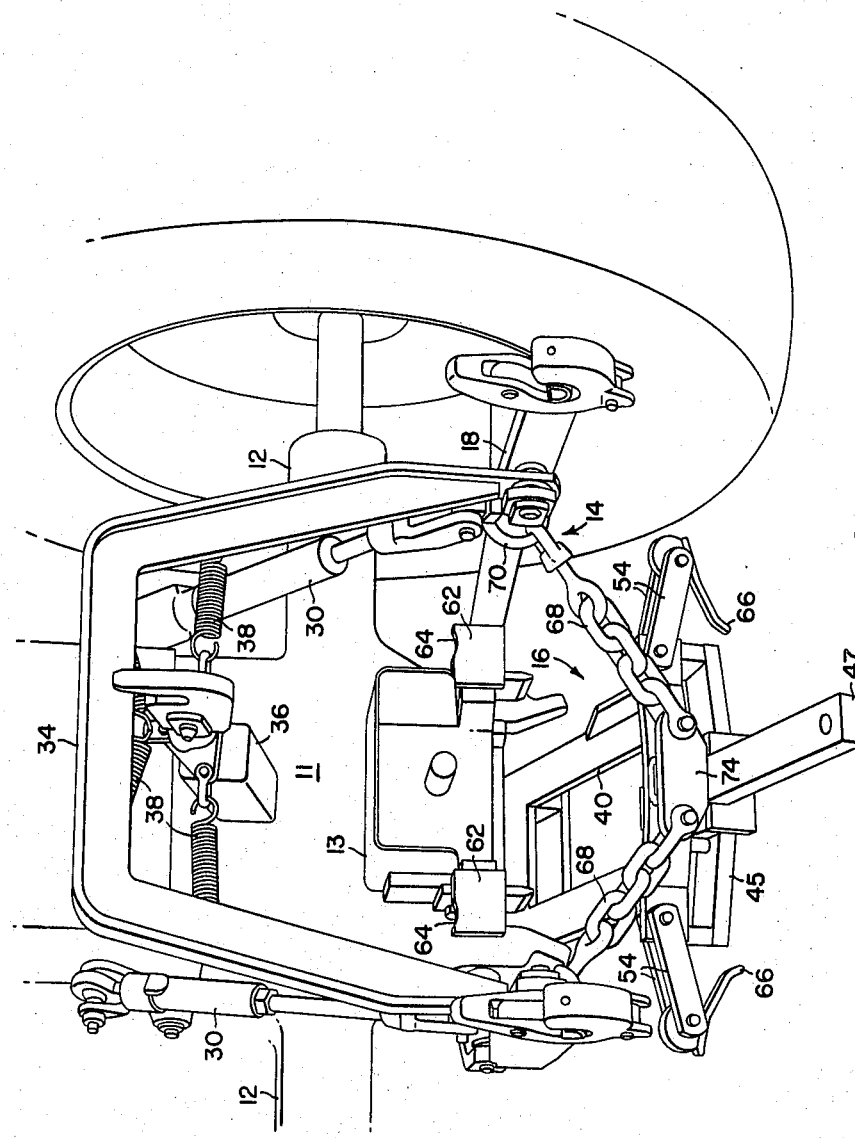
FIG. 2 is a view similar to FIG. 1 but showing the drawbar in a lowered pickup position.
Figure 3:
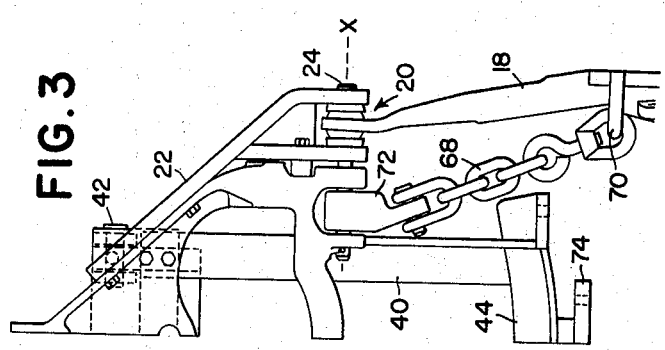
FIG. 3 is a plan view of a portion of the drawbar assembly.

Also, when the sway chains 68 are connected to the brackets 74, the drawbar 47 may be swung between the horizontal transport position, shown in FIG. 1, and the lowered pickup position, shown in FIG. 2, by merely unlatching the latch mechanisms 49 and 50 and actuating the lift cylinder 32 to raise or lower the draft links 18.

It is thought that the foregoing description makes further explanation of the operation unnecessary. Suffice it to say that the double uses of the sway chains 68 and the actuator 32 makes it possible to provide a compact, reliable and simple hitch system including a drawbar power swingable between pickup and transport positions.

I claim:

1. In a tractor of the type including a chassis, a pair of laterally spaced draft links, a pair of universal pivot connections respectively joining forward end portions of said pair of draft links to said chassis and defining a horizontal pivot axis about which the draft links are vertically swingable between an upper transport position and a lower working position, selectively actuatable power lift means connected between the chassis and said pair of draft links for swinging the latter between said transport and working positions, a drawbar located centrally between said pair of draft links and having a forward end portion positioned beneath said chassis, connection means securing the forward end portion of said drawbar to said chassis and defining a horizontal pivot axis about which said drawbar is swingable vertically between a raised generally horizontal towing position and a lowered pickup position and said pair of draft links being normally fixedly spaced laterally from each other when connected to an implement, the improvement comprising: unitary sway-limiting and motion transfer means being connected between said pair of draft links and said drawbar for raising and lowering said drawbar, respectively, in response to said draft links being raised and lowered by actuation of said power lift means, and for preventing said pair of draft links from swaying when they are in said transport position and are held fixed in said normal laterally spaced relationship to each other; and connection means located on said chassis and said sway-limiting and motion transfer means being optionally attachable to said connection means instead of to said drawbar assembly and said sway-limiting and motion transfer means and connection means together forming linkage means for preventing the draft links from swaying in any position of the draft links between and including said upper transport and lower working positions when the latter are fixed in said normal, laterally spaced relationship to each other.

2. The invention defined in claim 1 wherein said sway-limiting and motion transfer means includes a pair of lengths of chain, each chain having one end connected to a respective one of said draft links and having the other end connected to said drawbar assembly.

3. The invention defined in claim 1 and further including releasable latch means for releasably fixing said drawbar assembly to said chassis in a generally horizontal transport position.

4. The invention defined in claim 2 and further including releasable latch means for releasably fixing said drawbar assembly to said chassis in said generally horizontal transport position.

5. The invention defined in claim 2 wherein a pair of pivot connections are located on said chassis at laterally spaced positions along said horizontal pivot axis of said draft links and the ends of the pair of chains that are connected to the drawbar assembly being respectively optionally connectible to said pair of pivot connections for movement coaxial with that of the draft links and the lengths of the chains being such that they are relatively taut when connected to said chassis, whereby when said chains are connected to said chassis said draft links are prevented from swaying in all positions of said draft links when the latter are fixed in said normal, laterally spaced relationship to each other.

6. The invention defined in claim 3 wherein said releasable latch means comprises a pair of laterally spaced overcenter linkage means including a pair of laterally spaced latch seats fixed to said chassis and including a pair of upwardly facing, concave seating surfaces respectively formed about a first pair of centers of curvature; a pair of laterally spaced links respectively pivotally connected to said drawbar assembly for vertical swinging movement; a pair of latch levers respectively pivotally connected to said pair of links and respectively including a pair of convex camming surfaces having radii of curvature substantially equal to that of said seating surfaces; the centers of curvature of said camming surfaces being displaced from the pivot connections of said levers with said links; and said levers and links being so located relative to said seating surfaces that when said drawbar assembly is in a horizontal transport position, said camming surfaces are engageable with said seating surfaces and said levers are movable to dispose the pivot connections between said levers and links between an unlatched position to one side of the centers of curvature of said seating surfaces, and an overcenter latched position to the other side of the center of curvature of said seating surfaces.

7. The invention defined in claim 4 wherein said releasable latch means comprises a pair of laterally spaced overcenter linkage means including a pair of laterally spaced latch seats fixed to said chassis and including a pair of upwardly facing, concave seating surfaces respectively formed about a first pair of centers of curvature; a pair of laterally spaced links respectively pivotally connected to said drawbar assembly for vertical swinging movement; a pair of latch levers respectively pivotally connected to said pair of links and respectively including a pair of convex camming surfaces having radii of curvature substantially equal to that of said seating surfaces; the centers of curvature of said camming surfaces being displaced from the pivot connections of said levers with said links; and said levers and links being so located relative to said seating surfaces that when said drawbar assembly is in a said horizontal transport position, said camming surfaces are engageable with said seating surfaces and said levers are movable to dispose the pivot connections between said levers and links between an unlatched position to one side of the centers of curvature of said seating surfaces, and an overcenter latched position to the other side of the center of curvature of said seating surfaces.

8. The invention defined in claim 6 wherein said latch seats comprise a pair of laterally extending vertical plates; said links respectively including pairs of spaced straps movable into straddling relationship to said plates.

9. The invention defined in claim 7 wherein said latch seats comprise a pair of laterally extending vertical plates; said links respectively including pairs of spaced straps movable into straddling relationship to said plates.

10. In a tractor of the type including a chassis, a pair of draft links and a drawbar assembly extending rearwardly from and pivotally connected to said chassis for vertical swinging movement, power lift means connected between said chassis and said draft links for raising and lowering the latter, a pair of sway chains respectively having one of their ends connected to said pair of draft links; a first attachment means located on said tractor along the axis of pivotal movement of said draft links and a second attachment means located on said tractor at a location displaced from said axis; the other of the ends of said sway chains being optionally connectible to said first and second attachment means, and the lengths of the chains being so related to said first and second attachment means that the draft links are respectively prevented from swaying in all positions thereof when the chains are attached to said first attachment means, and free to sway except when they are in a raised transport position when said chains are connected to said second attachment means, the improvement comprising: said second attachment means being located on said drawbar assembly and releasable latch means for securing said drawbar assembly to said chassis in a generally horizontal transport position.

* * * * *